April 26, 1955  T. W. JENKINS  2,706,901
DEVICE FOR SUPPORTING BICYCLE PADLOCKS
Filed Sept. 7, 1954
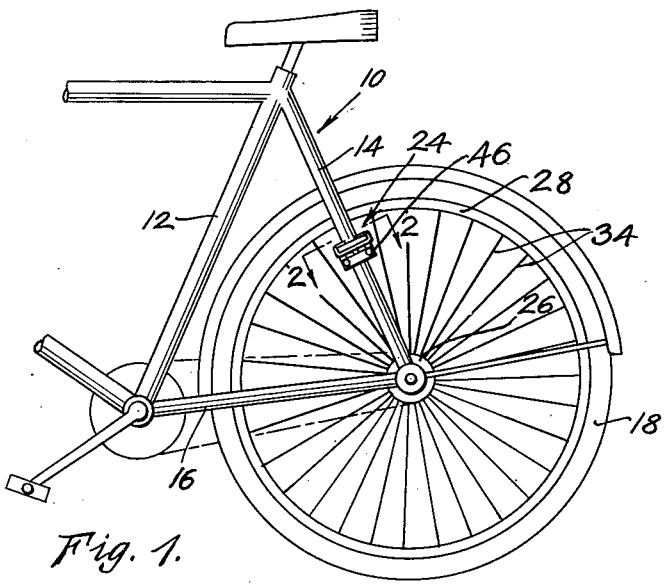
Fig. 1.
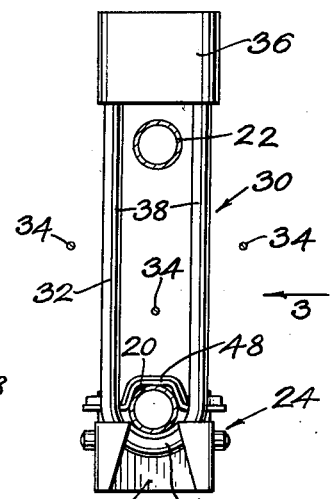
Fig. 2.
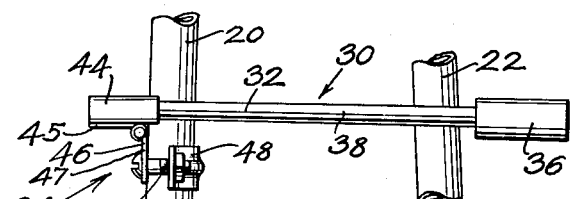
Fig. 3.
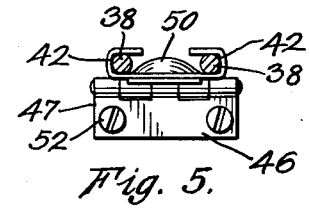
Fig. 5.
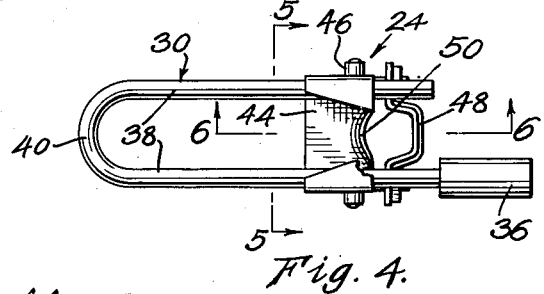
Fig. 4.
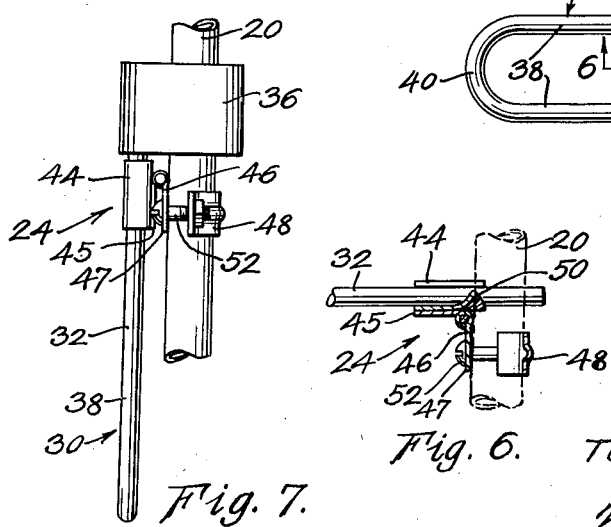
Fig. 6.
Fig. 7.
INVENTOR.
TOBIE W. JENKINS
BY
Martin E. Anderson
ATTORNEY United States Patent Office 2,706,901
Patented Apr. 26, 1955

2,706,901

DEVICE FOR SUPPORTING BICYCLE PADLOCKS

Tobie W. Jenkins, Denver, Colo.

Application September 7, 1954, Serial No. 454,291

2 Claims. (Cl. 70—227)

This invention relates to supporting devices; and more particularly, to hinged supporting devices for carrying bicycle padlocks on bicycles.

A tremendous number of bicycles are stolen each year because they are left unlocked. Lock manufacturers have, for some time, been producing a bicycle padlock with a long staple especially designed for use with bicycles because the staple can be passed around the bicycle fork and and through one of the wheels so that the wheel will not turn and the bicycle cannot be ridden away.

It is a difficult matter, however, to find a convenient place to carry this type of padlock on a bicycle. They are customarily locked to the handle bar or the seat when not in use. As a result, the padlock often rattles, scratches the paint, and is inconvenient to remove when it is necessary to lock the bicycle. Many boys and girls fail to lock their bicycles for these reasons and make them easy to steal.

It is the principal object of the present invention to provide a hinged supporting device for carrying bicycle padlocks which enables the padlock to be secured to the fork in position for immediate use.

A second object is to provide a padlock supporting device which furnishes a convenient place for carrying the padlock on a bicycle.

Further objects are the provision of hinged supporting devices for bicycle padlocks which are simple to use, inexpensive to manufacture, readily adaptable to any of the conventional bicycle padlocks, and which provide an attractive bicycle accessory.

Other objects will be in part apparent and in part pointed out specifically hereinafter in connection with the description of the drawing which follows, and in which:

Figure 1 is a side elevation showing a portion of the frame of a bicycle, a wheel and a hinged supporting device of the present invention attached in place to one branch of the fork;

Figure 2 is a section taken along line 2—2 of Figure 1;

Figure 3 is a view looking in the direction of arrow 3 of Figure 2;

Figure 4 is a view similar to Figure 2 showing the hasp of the padlock unlocked from the staple and the staple partly withdrawn in the retaining member;

Figure 5 is a section taken along line 5—5 of Figure 4;

Figure 6 is a section taken along line 6—6 of Figure 4; and,

Figure 7 is a view similar to Figure 3 showing the padlock in carrying position with the hasp unlocked.

Referring now to Figure 1 of the drawing, reference numeral 10 designates, in a general way, a conventional bicycle which has a frame 12, forks 14 and 16, and a wheel 18 mounted for rotation within the forks. The front wheel (not shown) is also mounted in a fork. Each fork has two branches which pass on opposite sides of the wheel. The branches of fork 14 have been shown herein in Figures 2 and 3 and designated by numerals 20 and 22. The hinged supporting device of the present invention, indicated in a general way by numeral 24, may be secured to either branch of any of the aforementioned forks in position between the hub 26 and the rim 28 of the wheel. It is preferred, however, that the supporting device be attached either to the front fork (not shown) or to fork 14 in the position indicated.

As will be seen most clearly in connection with Figures 2, 3 and 7, the supporting device of the present invention is designed to support a conventional bicycle padlock, indicated in a general way by numeral 30, in two basic positions; the first of these being the locking position shown in Figures 2 and 3 in which the staple 32 is locked around branches 20 and 22 of the fork between the spokes 34 of the wheel and, the second being the carrying position shown in Figure 7 in which the staple and hasp 36 of the padlock are withdrawn from the wheel and lie along the outside of branch 20 of the fork. Conventional staple 32 comprises parallel leg portions 38 interconnected at one end by transverse leg portion 40. Hasp 36 is either completely detachable from the parallel leg portions or permanently attached to one parallel leg portion and detachable from the other. The latter type has been illustrated although the supporting device of the present invention can be used equally well with either. The parallel leg portions of the staple are mounted for slidable movement within opposed channels 42, shown most clearly in Figure 5, formed in retaining member 44. The retaining member is permanently attached to movable leaf 45 of hinge member 46, the fixed leaf 47 of which is attached on the outside of one branch of the fork. The fixed leaf may be attached to the fork permanently as by welding it thereto; or detachably, as shown in Figures 2 through 7, so that it may be removed and adjusted. One means for detachably mounting the fixed leaf to the fork has been shown in connection with Figures 2 through 7 of the drawing. It consists merely of a bracket 48 positioned on the inside of the branch opposite the hinge member and secured to the fixed leaf thereof by bolts 52. The movable leaf is attached to the fixed leaf for relative angular movement with respect thereto and opens away from the wheel. The hinge pin therein extends across the branch and the staple slides across the hinge pin. The channels of the retaining member are positioned such that with the staple mounted for slidable movement therein, the parallel leg portions will extend in the direction of the length of the branch when the retaining member lies alongside the fixed leaf in the carrying position, and so that the parallel leg portions will slide on opposite sides of both branches of the fork when in locking position.

Referring now in particular to Figures 4, 5 and 6, it will be seen that a stop 50 is formed in the retaining member in position to engage the transverse leg portion of the staple thereby preventing the padlock from being withdrawn from the retaining member without first removing the hasp from the staple. Of course, if the hasp is detachable from the staple, the staple itself may be withdrawn from the retaining member in one direction. If, however, the hasp is not detachable from both leg portions of this staple the padlock cannot be removed. In this instance, the stop is preferably formed after the staple is in place within the retaining member rather than forming the channels in the retaining member after the staple is in place. This feature prevents the padlock from being stolen out of the supporting device when in carrying position. Note, however, in connection with Figures 2 and 3, that when the padlock is in the locking position the hinge supporting device of the present invention is locked to the fork.

Figures 3, 4 and 7 clearly illustrate the operation of the hinged supporting device. The device and padlock are shown in the carrying position in Figure 7 with the exception of the fact that the hasp is normally carried locked to the staple. When it is necessary to lock the bicycle the hasp is unlocked from the staple and pivoted into the position shown alongside branch 20 of the fork. The movable leaf, retaining member and padlock are then moved angularly outward and upward with respect to the fixed leaf and the hasp and parallel leg portions are slide inward as shown in Figure 4. Finally, the padlock is secured in the position shown in Figures 2 and 3 with both branches of the fork enclosed within the parallel leg portions, the hasp and the transverse leg portion. Reversing the above procedure moves the padlock and hinged supporting device from the locking position to the carrying position.

Having thus described the many novel and useful features of the hinged supporting device of the present invention it will be seen that the several useful objects for which it was designed have been achieved; and therefore, I claim:

1. An article of manufacture comprising: a hinge member having a fixed leaf and a movable leaf interconnected by a hinge pin for relative angular movement; means carried by the fixed leaf for connecting said leaf to a branch of bicycle fork; and, a retaining member carried by the movable leaf for relative angular movement with respect to the fixed leaf, said retaining member having means comprising opposed channels for holding the parallel leg portions of a bicycle padlock staple for slidable movement across the hinge pin.

2. An article of manufacture comprising: a hinge member having a fixed leaf and a movable leaf interconnected by a hinge pin for relative angular movement; means carried by the fixed leaf for connecting said leaf to a branch of a bicycle fork; a retaining member carried by the movable leaf for relative angular movement with respect to the fixed leaf, said retaining member having means comprising opposed channels for holding the parallel leg portions of a bicycle padlock staple for slidable movement across the hinge pin; and means comprising a stop carried by the retaining member between the channels to engage the transverse leg portion of a bicycle padlock staple thereby preventing said staple from being withdrawn from said retaining member.

References Cited in the file of this patent

UNITED STATES PATENTS

| | | |
|---|---|---|
| 1,931,020 | Clark | Oct. 17, 1933 |

FOREIGN PATENTS

| | | |
|---|---|---|
| 3,657 | Netherlands | May 23, 1919 |
| 351,766 | Germany | Apr. 11, 1922 |